US009608522B2

United States Patent
Lin

(10) Patent No.: US 9,608,522 B2
(45) Date of Patent: Mar. 28, 2017

(54) HIGH EFFICIENCY BOOST CONVERTER

(75) Inventor: Hongwu Lin, Shenzhen (CN)

(73) Assignee: STMICROELECTRONICS (SHENZHEN) R&D CO. LTD., Shenzhen (CN)

( * ) Notice: Subject to any disclaimer, the term of this patent is extended or adjusted under 35 U.S.C. 154(b) by 1117 days.

(21) Appl. No.: 13/469,287

(22) Filed: May 11, 2012

(65) Prior Publication Data
US 2013/0002224 A1 Jan. 3, 2013

(30) Foreign Application Priority Data

Jun. 30, 2011 (CN) .......................... 2011 1 0192305

(51) Int. Cl.
G05F 1/00 (2006.01)
H02M 3/158 (2006.01)
H02M 1/36 (2007.01)
H02M 1/00 (2006.01)

(52) U.S. Cl.
CPC ............ *H02M 3/158* (2013.01); *H02M 1/36* (2013.01); *H02M 2001/0032* (2013.01); *Y02B 70/16* (2013.01)

(58) Field of Classification Search
CPC . H02M 1/36; H02M 2001/0032; H02M 3/158
USPC ....... 323/222, 225, 271, 234, 237, 241, 265, 323/266, 273–275, 282–285, 299, 300
See application file for complete search history.

(56) References Cited

U.S. PATENT DOCUMENTS

| 6,809,504 B2 * | 10/2004 | Tang .................. G06F 1/305 323/274 |
| 7,391,192 B2 | 6/2008 | Ostrom et al. |
| 7,723,971 B2 * | 5/2010 | Hachiya .................. 323/282 |

(Continued)

FOREIGN PATENT DOCUMENTS

| CN | 1635694 A | 7/2005 |
| CN | 1832315 A | 9/2006 |
| CN | 1973420 A | 5/2007 |

OTHER PUBLICATIONS

Chinese 1st Office Action for CN 201110192305.3 mailed Jul. 1, 2014 (9 pages).

(Continued)

*Primary Examiner* — Adolf Berhane
*Assistant Examiner* — Afework Demisse
(74) *Attorney, Agent, or Firm* — Gardere Wynne Sewell LLP

(57) ABSTRACT

A boost converter circuit receives an input power supply voltage and produces an output boosted supply voltage. The circuit includes a voltage regulator, boosting circuitry, and a timing controller. The voltage regulator provides a regulated voltage to the boosting circuitry, which controls switching a transistor to drive the output boosted supply voltage; and the timing controller controls switching the boost circuit from the start-up mode to the normal operation mode. In start-up mode, the regulated voltage is generated from the input power supply voltage. During normal operation mode, the regulated voltage is generated from the output boosted supply voltage. The circuitry performs a low-power start-up when the input power supply voltage is low, and maintains efficient low-power operation by driving the transistor to produce the output boosted supply voltage as the input power supply voltage decreases.

26 Claims, 5 Drawing Sheets

(56) References Cited

U.S. PATENT DOCUMENTS

| | | | |
|---|---|---|---|
| 2006/0158165 A1* | 7/2006 | Inn .......................... | G05F 1/575 |
| | | | 323/280 |
| 2008/0054867 A1* | 3/2008 | Soude ..................... | G05F 1/575 |
| | | | 323/282 |
| 2009/0289613 A1* | 11/2009 | Shoji ...................... | H02M 7/48 |
| | | | 323/299 |
| 2010/0079126 A1* | 4/2010 | Pigott ................... | H02M 3/156 |
| | | | 323/285 |

OTHER PUBLICATIONS

Torex Semicondcutor Ltd.: Datasheet for XC6367/XC6368 Series, "PWM Controlled, PWM/PFM Switchable Step-up DC/DC Controllers," publication date unknown, see http://www.torex-europe.com/products/ranges/32.

Semiconductor Components Industries, LLC: NCP1400A datasheet, "100m!, Fixed Frequency PWM Step-Up Micropower Switching Regulator," Mar. 2006, see http://www.onsemi.com/PowerSolutions/product.do?id=NCP1400A.

Second Office Action for CN 201110192305.3 dated Mar. 31, 2015 (11 pages).

Fourth Office Action and Search Report for CN 201110192305.3 dated May 25, 2016 (11 pages).

* cited by examiner

HIGH EFFICIENCY BOOST CONVERTER

PRIORITY CLAIM

This application claims priority from Chinese Application for Patent No. 201110192305.3 filed Jun. 30, 2011, the disclosure of which is hereby incorporated by reference.

BACKGROUND

Technical Field

The present invention relates generally to boost converter circuitry and, more specifically, to a boost converter circuit that is able to perform a low-power startup and maintain efficient operation with a decreased power supply.

Introduction

Boost circuits are typically designed to receive an input voltage and produce an output voltage greater than the input voltage. Such an example boost circuit is illustrated in FIG. 1, wherein the example boost circuit 100 comprises an internal LDO regulator circuit 102 whose power supply node is connected to a power supply 104. However, because the internal circuitry in the example boost circuit 100 in FIG. 1 is powered by the power supply 104 in the form of a battery, this circuit 100 is particularly susceptible to reduction of the power supply 104. As such, the circuit 100 in FIG. 1 is more suitable for higher-voltage power supplies such as, for example, lithium-ion batteries having a voltage supply of approximately 3-5V, and not low-voltage power supplies such as, for example, those within a range of approximately 1.2V to 1.5V.

FIG. 2 illustrates another example boost circuit 200, wherein the internal LDO regulator circuit 202 is powered at its power supply node by the output voltage produced by the boost circuit 200. Although the circuit 200 in FIG. 2 may provide a solution to the internal circuitry power supply issues present in the circuit 100 in FIG. 1, the circuit 200 in FIG. 2 requires a relatively high supply voltage to maintain operation after it starts up. As such, the circuit 200 in FIG. 2 is particularly vulnerable to a decrease in the supply voltage 204 after start-up, and therefore, is not a practical solution for applications in which the supply voltage 204, for example, from a battery, decreases during normal operation of the boost circuit 200.

FIG. 3 illustrates another example boost circuit 300, wherein the example boost circuit 300 omits the internal regulator circuitry and, instead, couples the power supply node of its internal boost circuitry 302 directly to the power supply 304. FIG. 4 illustrates yet another example boost circuit 400 similar to the example boost circuit 300 in FIG. 3, but where the power supply node of the internal boost circuitry 402 is coupled directly to the output voltage of the boost circuit 400. The example embodiments illustrated in FIGS. 3 and 4 are designed to allow for easier start-up of the respective boost circuits; however, these circuits are sensitive to external interference. For example, when the internal resistance of the power supply is relatively large (e.g., 0.5 ohms), the boost circuit 300 in FIG. 3 experiences a significant decrease in boost efficiency, typically caused by a decrease in the voltage driving an output transistor 306 as the output current of the circuit 300 increases. Additionally, the boost circuit 300 in FIG. 3 fails during low-power operation when the voltage at the power supply 304 experiences a significant decrease. The boost circuit 400 in FIG. 4 becomes unstable when a load transient jump occurs at its output, causing the output of the circuit 400 to oscillate. As such, conventional boost converter circuitry such as, for example, that described above and illustrated in FIGS. 1-4, fails to provide low-power start-up and efficient low-power operation.

SUMMARY

The present disclosure provides a boost converter circuit operable to achieve low-power start-up and maintain efficient low-power operation. In one embodiment the boost converter circuit comprises voltage regulating circuitry operable to produce a regulated voltage, wherein said regulated voltage is generated from an input power supply voltage during a first mode and is alternatively generated from an output power supply voltage during a second mode; boost circuitry supplied from said regulated voltage and operable to control switching of a transistor during said first mode and said second mode to generate said output power supply voltage; and control circuitry operable to switch said circuit from said first mode to said second mode in response to one of detecting said output power supply voltage reaching a threshold voltage or detecting expiration of a defined start-up time.

Another embodiment of the present disclosure includes a boost circuit comprising a voltage regulator operable to provide a regulated voltage, wherein said regulated voltage is generated from an input power supply voltage during a start-up mode and is alternatively generated from an output power supply voltage during a normal operation mode; boosting circuitry operable to receive said regulated voltage and operable to control switching of a transistor, said transistor driving said output power supply voltage to a first voltage during said start-up mode; and a controller circuit operable to switch said boost circuit from said start-up mode to said normal operation mode in response to detecting said output power supply voltage reaching said first voltage.

Another embodiment of the present disclosure includes a method for controlling operation of a boost converter circuit, the method comprising supplying a voltage regulator with an input power supply voltage and an output power supply voltage; in a first mode of operation, producing a first regulated voltage, wherein said first regulated voltage is generated from said input power supply voltage; using said first regulated voltage to control switching of a transistor to drive said output power supply voltage to a first threshold voltage; in a second mode of operation, producing a second regulated voltage, wherein said second regulated voltage is generated from said output power supply voltage; and using said second regulated voltage to control switching of said transistor to drive said output voltage to a second threshold voltage.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures not drawn to scale, in which like reference numbers indicate similar parts, and in which.

DETAILED DESCRIPTION OF THE DRAWINGS

The present disclosure provides a high efficiency boost converter circuit. The disclosed boost converter circuit is operable to achieve low-power start-up and maintain efficient low-power operation. In accordance with the present disclosure, low-power start-up refers to the disclosed boost converter circuit's capability to start-up when the power supply of the boost converter circuit is producing a significantly decreased supply voltage relative to its designed supply voltage. For example, the disclosed boost converter circuit may implement a low-voltage power supply such as, for example, an alkaline battery having a start-up voltage range of approximately 1.2-1.5V and an internal resistance of 0.5 ohms. As such, the disclosed boost converter circuit may perform a low-power start-up when the supply voltage of the power supply is at a reduced voltage of approximately 1V. It should also be noted that low-power operation of the disclosed boost converter circuit is determined herein to be the duration for which the supply voltage of the power supply is less than its start-up voltage when the boost converter circuit is operating in normal operation mode (i.e., not start-up). For example, if the boost converter circuit performs a low-power start-up at approximately 1V, then low-power operation may occur when the power supply is reduced to, for example, between 0.6V to 1.0V while operating in a normal operation mode. What's more, low-power operation is deemed to be efficient when a driving voltage having a consistent peak voltage is maintained at a power transistor controlling the charging of an output capacitor (to generate the output voltage) when the supply voltage decreases as the circuit is operating in the normal operation mode. It should be appreciated that the voltage parameters set forth herein are intended to provide generic examples for describing operation of the disclosed boost converter circuit, and are not intended to limit the scope of the present disclosure as set forth in the claims provided below.

Figure 1:
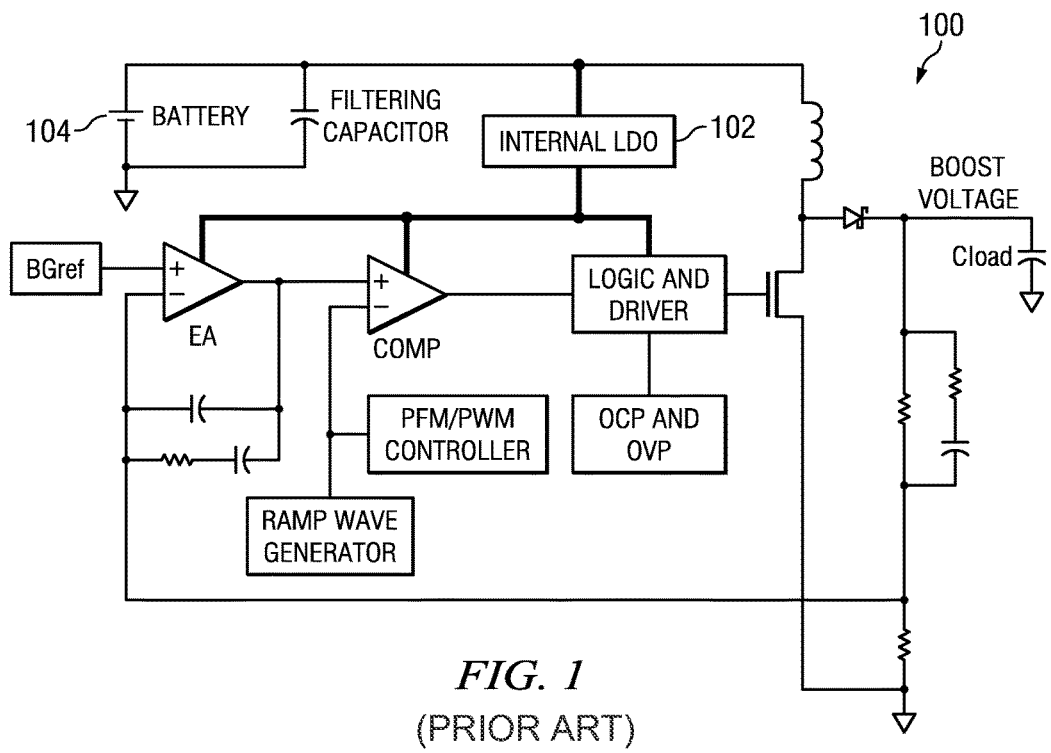
FIG. 1 illustrates a first example boost converter circuit known in the art.
Figure 2:
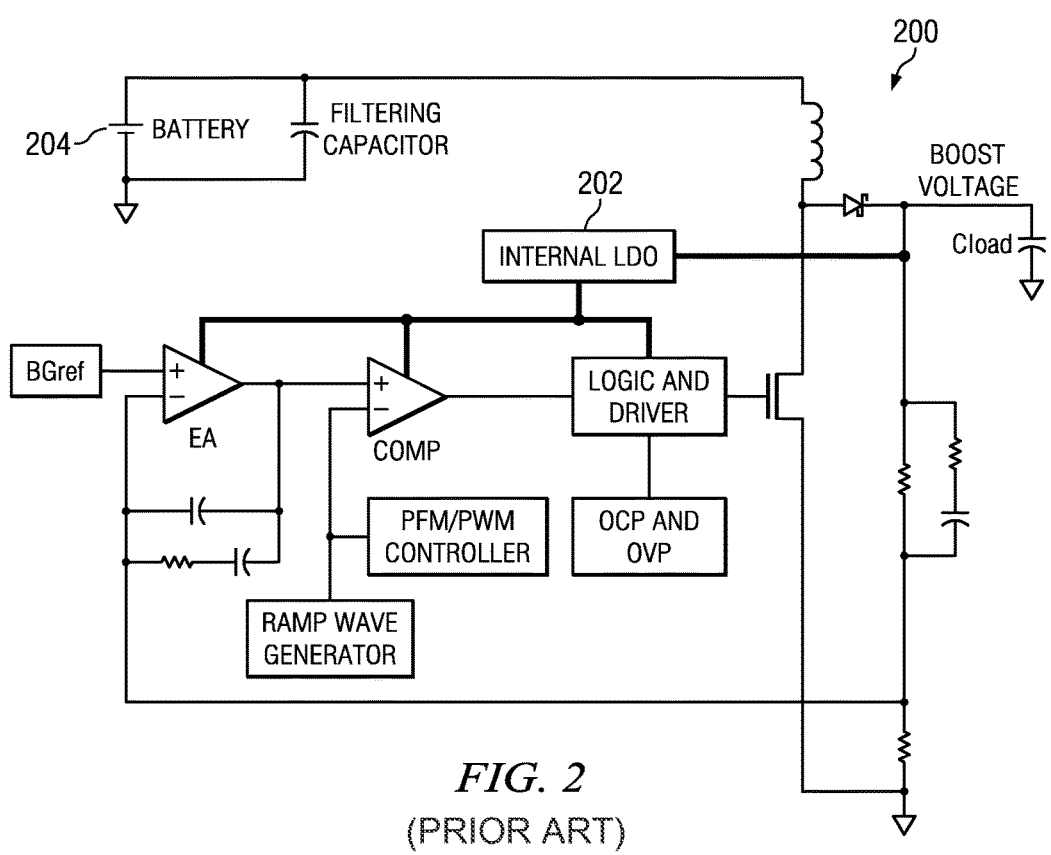
FIG. 2 illustrates a second example boost converter circuit known in the art.
Figure 3:
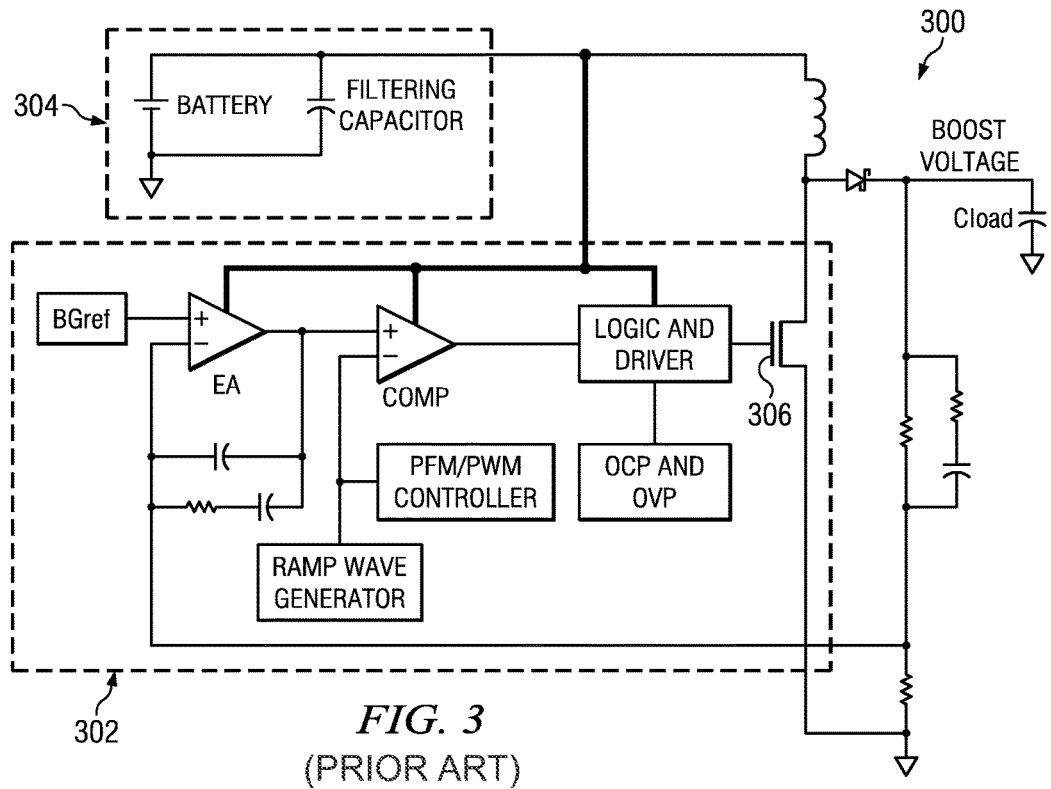
FIG. 3 illustrates a third example boost converter circuit known in the art.
Figure 4:
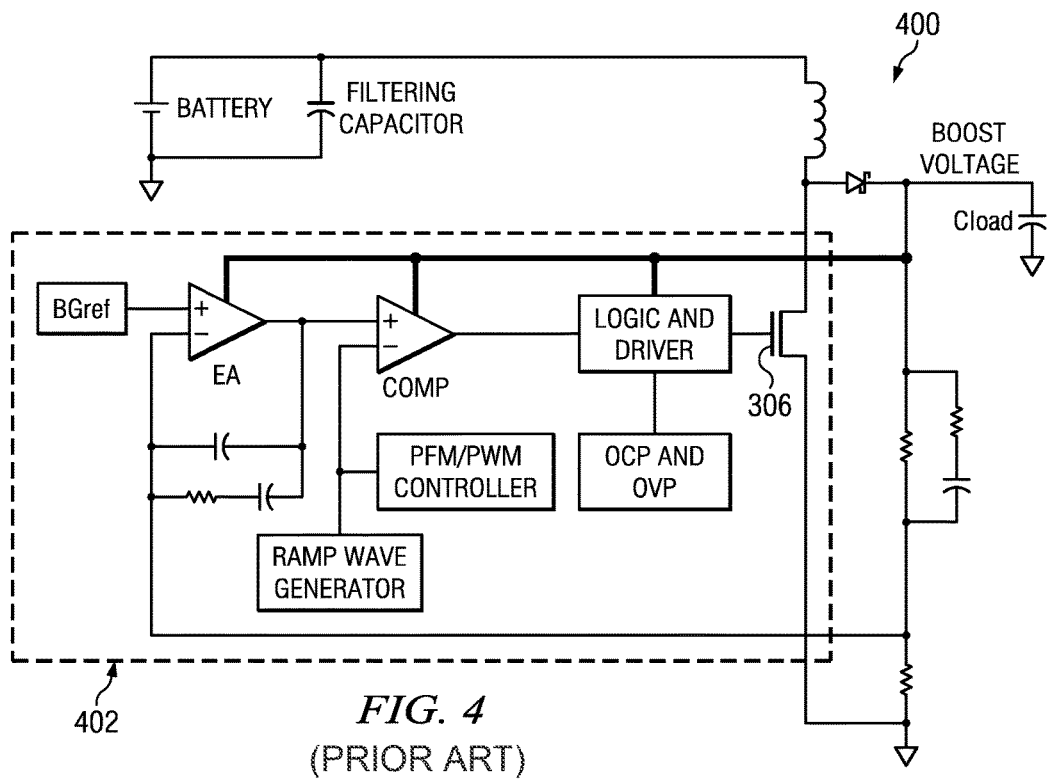
FIG. 4 illustrates a fourth example boost converter circuit known in the art.
Figure 5:
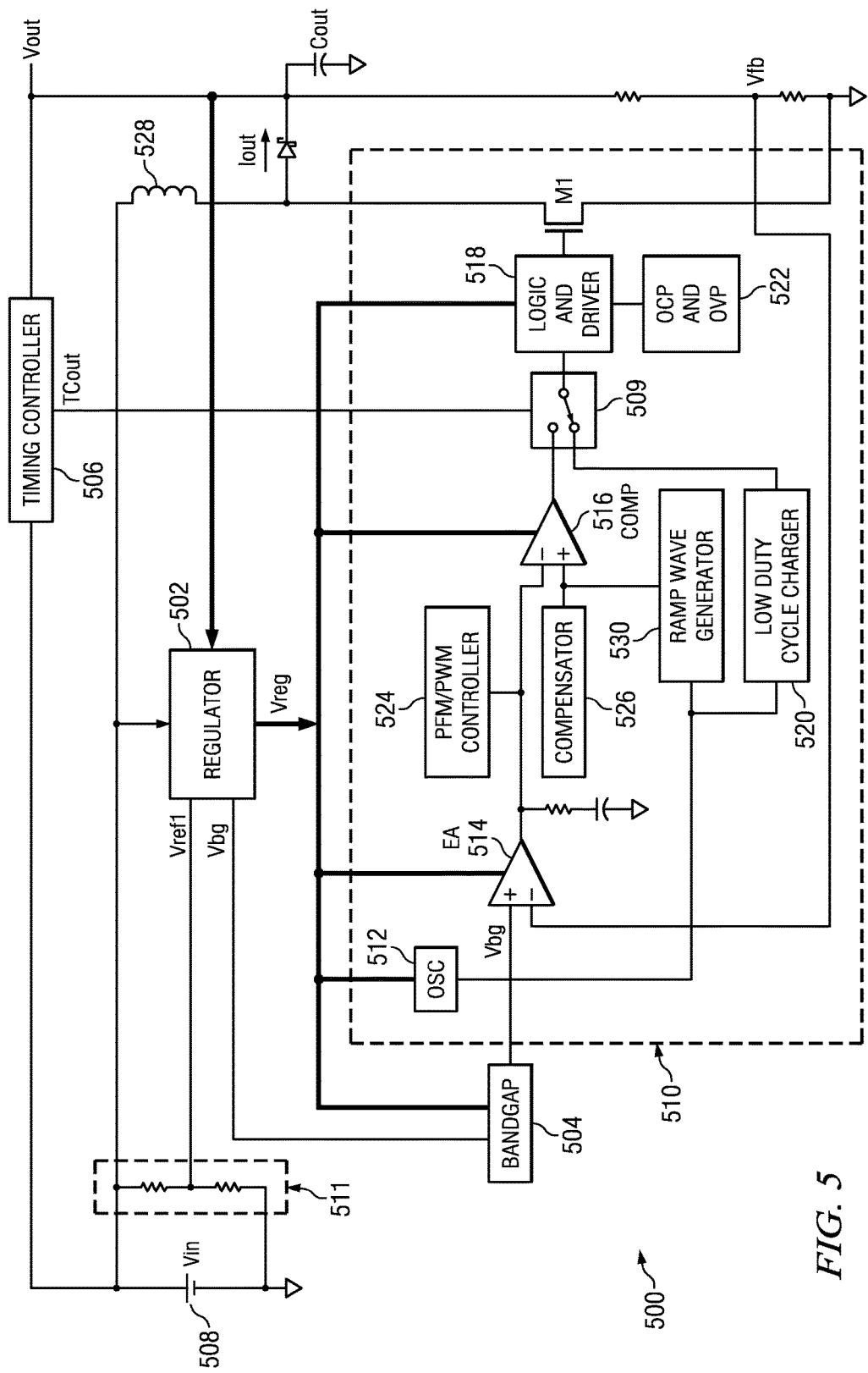
FIG. 5 illustrates an example embodiment of the disclosed boost converter circuit.

FIG. 5 illustrates an example embodiment of the disclosed boost converter circuit 500, wherein the boost converter circuit 500 generally comprises a voltage regulator 502, a bandgap 504, a timing controller 506, and internal circuitry 510 for controlling operation of the boost converter circuit 500. In general, the boost converter circuit 500 is designed to receive an input voltage Vin from a power supply 508, wherein, during a start-up mode, the input voltage Vin is used as a power supply to power the regulator 502 for the internal circuitry 510 and the regulated output voltage is used to produce a low duty cycle driving signal at a switching power transistor M1 to generate a boosted output voltage Vout. The boost converter circuit 500 then switches to a normal operation mode, wherein the boosted output voltage Vout (which is now greater than the input voltage Vin) is used as a power supply to power the regulator 502 for the internal circuitry 510 and the regulated output voltage is used to produce a pulse-width modulated driving signal at the switching power transistor M1 to generate the boosted output voltage Vout. During both start-up and normal operation, the internal circuitry 510 drives the power transistor M1 to control the charging of an output capacitor Cout to produce the boosted output voltage Vout, wherein the output capacitor Cout is charged using the input voltage Vin produced by the power supply 508.

As mentioned above, the boost converter circuit 500 operates in two modes: start-up and normal operation. The boost converter 500 operates in start-up mode until a) the boosted output voltage Vout reaches a predetermined threshold voltage, or b) a defined period of time expires. When one of those two events occurs, the boost converter 500 switches to the normal operation mode. During start-up mode, the input voltage Vin is applied as a power supply for the regulator 502 to produce a regulated voltage to power the internal circuitry 510, and the overall circuit operates to generate and slowly increase the boosted output voltage Vout. The start-up mode may be performed as a low-power start-up when the power supply 508 is producing a low input voltage Vin (relative to its designed input voltage). For example, in an embodiment disclosed herein, the power supply 508 may be a 1.25V battery having an internal resistance of 0.5 ohms, wherein the battery is producing a low input voltage Vin of approximately 1V during start-up. When the boost converter 500 switches to normal operation mode, the boosted output voltage Vout is applied as a power supply for the regulator 502 to produce a regulated voltage to power the internal circuitry 510, and the overall circuit operates to continue increasing the boosted output voltage Vout until it reaches its designed boosted output voltage. The normal operation mode may be performed as a low-power operation when the input voltage Vin is less than the start-up input voltage (i.e., Vin during start-up mode). For example, in the embodiment discussed above, the input voltage Vin of the 1.25V battery may decrease below 1V during normal operation mode, at which point the boost converter circuit performs low-power operation.

In an embodiment of the present disclosure, the disclosed boost converter circuit 500 is operable to perform a low-power start-up and maintain efficient low-power operation when the power supply 508 is a 1.25V battery having an internal resistance of 0.5 ohms producing an input voltage Vin, wherein the input voltage Vin is approximately 1V during start-up (i.e., low-power start-up) and decreases to approximately 0.6V during normal operation mode (i.e., low-power operation). In the present embodiment, the disclosed boost converter 500 operates in start-up mode and then switches to normal operation mode when either a) the boosted output voltage Vout reaches approximately 2V, or b) expiration of a defined period of time. In the present embodiment, the boost converter circuit 500 is designed to achieve a boosted output voltage Vout of approximately 3.3V, and an output current Iout ranging from 0-100 mA. As explained below, when the input voltage Vin is 1V, the boost converter circuit 500 achieves low-power start-up by using the input voltage Vin as a power supply to power the regulator 502 and to produce a low duty cycle driving signal at the power transistor M1 to generate the boosted output voltage Vout. Additionally, the boost converter circuit 500 maintains efficient low-power operation during the normal operation mode by using the boosted output voltage Vout as a power supply to power the regulator 502 and to produce a pulse-width modulated driving signal at the power transistor M1 to generate the boosted output voltage Vout, even as the input voltage Vin decreases during normal operation mode.

The timing controller 506 is provided to control switching of the boost converter circuit 500 from start-up mode to normal operation mode. As mentioned above, the timing controller 506 switches from start-up mode to normal operation mode when one of two events occurs. The first event is voltage-dependent and involves switching from start-up mode to normal operation mode when the boosted output voltage Vout reaches a predefined threshold value. The second event is time-dependent and involves switching from start-up mode to normal operation mode following expiration of a defined period of time.

As shown in FIG. 5, the timing controller 506 receives the input voltage Vin and the output voltage Vout, and produces a logic output signal TCout for controlling operation of a switch 509 to select whether the internal circuitry 510 of the boost converter circuit 500 is operating in an open loop or closed loop mode. The boost converter circuit 500 operates in start-up mode when the internal circuitry 510 is operating in an open loop mode and operates in normal operation mode when the internal circuitry 510 is operating in a closed loop mode. Therefore, when the timing controller 506 switches the internal circuitry 510 from open loop mode to closed loop mode, the timing controller 506 is switching the boost converter circuit 500 from start-up mode to normal operation mode.

Figure 6:
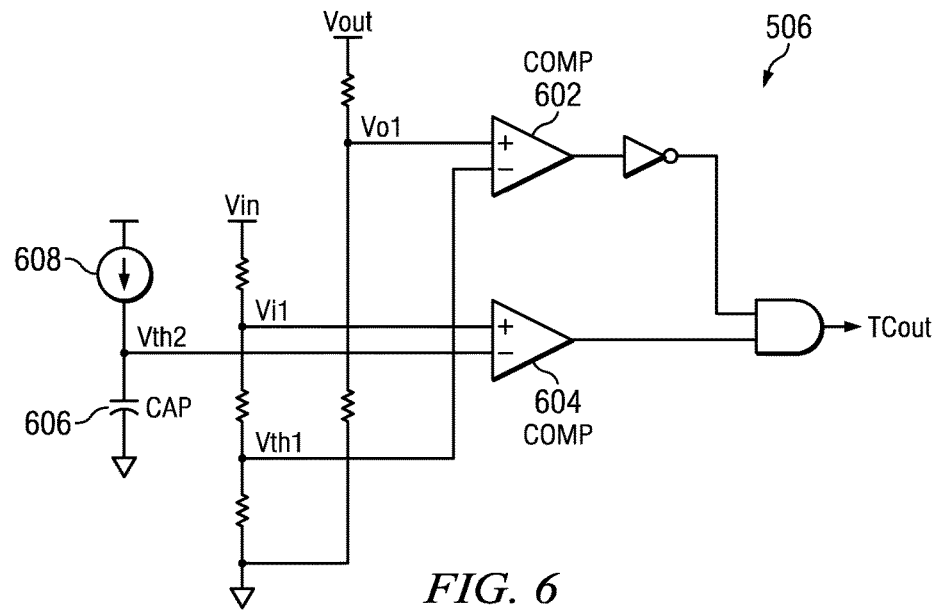
FIG. 6 illustrates an example embodiment of the timing controller circuitry provided by the example embodiment of the disclosed boost converter circuit illustrated in FIG. 5.

An example embodiment of the timing controller 506 is illustrated in FIG. 6, wherein the timing controller 506 comprises a first comparator 602 and a second comparator 604. The first comparator 602 is provided in connection with sensing the voltage-dependent mode switching event, and compares an output reference voltage Vo1 to a threshold voltage Vth1 to determine if the output voltage Vout has reached a predefined voltage (e.g., 2V). If Vo1 rises to a value greater than or equal to Vth1 during start-up, then the boosted output voltage Vout has reached the predefined voltage, and the logic output signal TCout triggers the switch 509 to place the internal circuitry 510 in a closed loop mode (i.e., to change from start-up mode to normal operation mode). The second comparator 604 is provided in connection with sensing the time-dependent event, and compares an input reference voltage Vi1 to a ramping timing threshold voltage Vth2. The time-dependent event sets a defined period of time for which the start-up mode will operate (provided the voltage-dependent event does not occur first). The defined period of time is dependent upon the ramping timing threshold voltage Vth2, wherein a slope of the ramp may be altered by adjusting the value of the capacitor 606 and/or the capacitor charge current 608. If ramping voltage Vth2 rises to a value greater than or equal to Vi1 during start-up, then the defined period of time has passed, and the logic output signal TCout triggers the switch 509 to place the internal circuitry 510 in a closed loop mode (i.e., to change from start-up mode to normal operation mode).

Referring back to FIG. 5, the voltage regulator 502 receives the input voltage Vin, boosted output voltage Vout, and two reference voltages Vref1 and Vbg, and produces a regulated output voltage Vreg at a power supply node for the internal circuitry 510 and bandgap circuit 504. The first reference voltage Vref1 is generated by a voltage divider 511 coupled to the power supply 508, and the second reference voltage Vbg is the voltage generated by the bandgap circuit 504. In summary, the regulated output voltage Vreg is generated from the input voltage Vin when the boost converter circuit 500 is in start-up mode, and is generated from the boosted output voltage Vout when the boost converter circuit 500 is in normal operation mode. The regulated voltage Vreg is used to power the bandgap 504 and internal circuitry 510, wherein the internal circuitry receiving the regulated voltage Vreg includes an oscillator 512, an error amplifier 514, a comparator 516, and logic and driver circuitry 518 whose power supply nodes are coupled to receive Vreg. The voltage regulator 502 provides immunity to external interference by providing a constant, regulated voltage to circuitry in the boost converter circuit 500. Since the voltage regulator 502 provides a constant voltage supply to the internal circuitry 510, a pulse-width modulated driving voltage having a consistent peak voltage is maintained at the power transistor M1 controlling the charging of the output capacitor Cout when the circuit is operating in normal mode.

Figure 7:
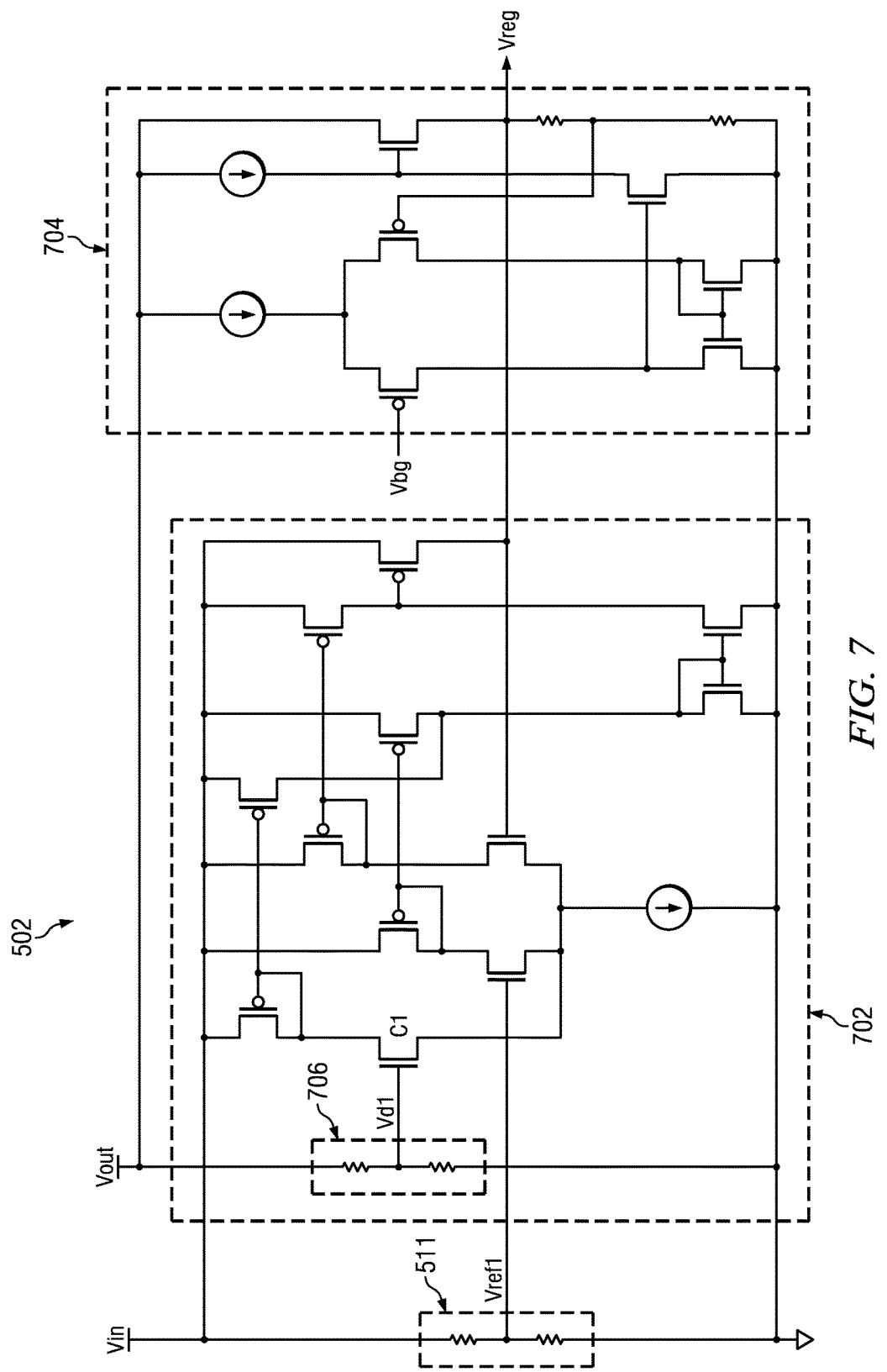
FIG. 7 illustrates an example embodiment of the voltage regulator circuitry provided by the example embodiment of the disclosed boost converter circuit illustrated in FIG. 5.

An example embodiment of the voltage regulator 502 is illustrated in FIG. 7, wherein the voltage regulator 502 shown in FIG. 7 is a self-switching, low drop-out voltage regulator. The voltage regulator 507 is comprised of a first section 702 and a second section 704. The first section 702 receives the reference voltage Vref1, input voltage Vin, and boosted output voltage Vout and, when activated, uses the input voltage Vin to drive the regulated voltage Vreg. The second section 704 receives the bandgap voltage Vbg and boosted output voltage Vout and, when activated, uses the boosted output voltage Vout to drive the regulated voltage Vreg.

The first section 702 includes a voltage divider 706 receiving the boosted output voltage Vout and producing a divided voltage Vd1 at a control transistor C1, wherein the control transistor C1 controls the "self-switching" function of the voltage regulator 502. During start-up mode, the divided voltage Vd1 is too low to activate the control transistor C1, and the first section 702 is activated. As such, the input voltage Vin is used as the power supply for the regulator 502, and the regulated voltage Vreg will regulate based on the reference voltage Vref1.

When the boost converter circuit 500 is switching from start-up mode to normal operation mode, the divided voltage Vd1 is great enough to activate the control transistor C1, which turns off the first section 702 and activates the second section 704. When this happens, the boosted output voltage Vout is used as the power supply for the regulator 502, and the regulated voltage Vreg will regulate based on the bandgap voltage Vbg. When the first section 702 is turned off, the input voltage Vin is effectively isolated from the internal circuitry 510. As such, during normal operation, a reduction of the input voltage Vin has little effect on the regulated voltage Vreg provided to the internal circuitry 510 of the boost converter circuit 500, thus allowing the boost converter circuit 500 to maintain efficient low-power operation. By using the input voltage Vin to drive the regulated voltage Vreg during start-up mode, and using the boosted output voltage Vout to drive the regulated output voltage Vreg during normal operation mode, the voltage regulator 502 continuously supplies sufficient, regulated voltage to the bandgap 504 and internal circuitry 510, thereby allowing for efficient operation of the boost converter circuit 500 during both start-up and normal operation, and even during low-power operation.

Figure 8:
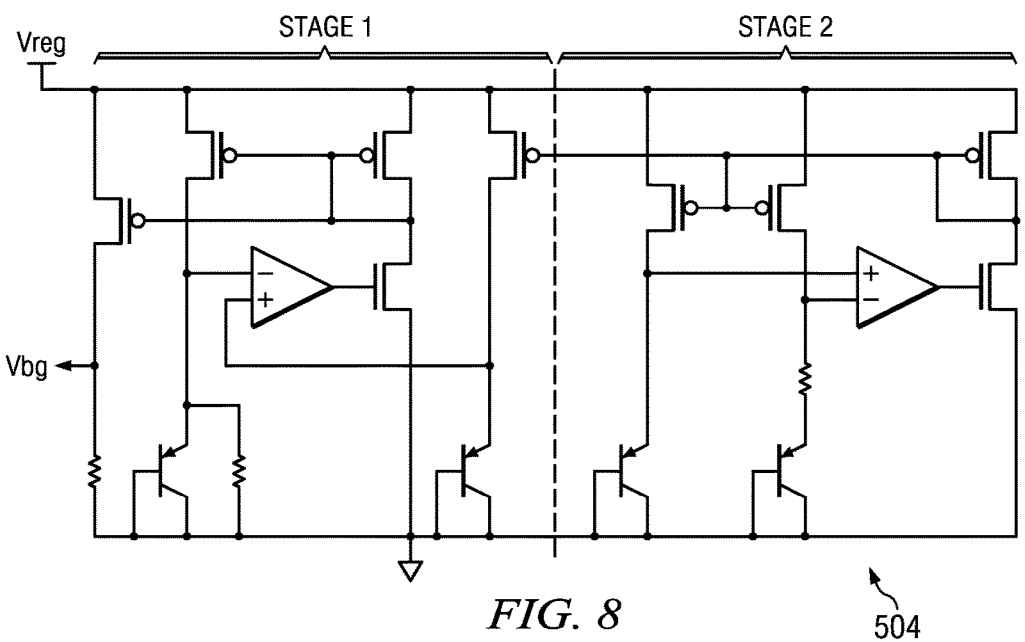
FIG. 8 illustrates an example embodiment of the bandgap circuitry provided by the example embodiment of the disclosed boost converter circuit illustrated in FIG. 5.

As described above, the bandgap 504 receives the regulated voltage Vreg from the regulator 502, and produces the bandgap voltage Vbg, which is supplied as a reference voltage to the voltage regulator 502 and the error amplifier 514. An example embodiment of the bandgap 504 is illustrated in FIG. 8, wherein the bandgap 504 shown in FIG. 8 is a two-stage, low voltage supplied bandgap. During start-up mode, the regulated voltage Vreg is driven by the input voltage Vin, and the first stage of the bandgap 504 is activated and produces a complementary to absolute temperature (CTAT) current which is used in the manner described below to generate the bandgap voltage Vbg. As the regulated voltage Vreg stabilizes during start-up, the second stage of the bandgap 504 becomes activated and generates a proportional to absolute temperature (PTAT) current. The first stage then combines the CTAT and PTAT currents to generate a bandgap voltage Vbg capable of providing a stable reference voltage for the voltage regulator 502 and error amplifier 514. As explained above, the bandgap voltage Vbg is then used as a reference voltage in the voltage regulator 502 and error amplifier 514 during normal operation.

As mentioned above, the internal circuitry 510 operates in an open loop mode when the boost converter circuit 500 is in start-up mode, and operates in a closed loop mode when the boost converter circuit 500 is in normal operation mode. During open loop mode operation, the oscillator 512 receives the regulated voltage Vreg (which is supplied by the regulator 502 from the input voltage Vin) and drives low duty cycle charger circuitry 520. The switch 509 couples the output of the low duty cycle charger circuitry 520 to the logic and driver circuitry 518 (coupled to over current protection and over voltage protection circuitry 522), thereby driving the power transistor M1, which controls the slow charging of the output capacitor Cout to generate the boosted output voltage Vout. As the boosted output voltage Vout continues to increase, it eventually reaches the pre-defined threshold voltage (e.g., 2V) that triggers the timing controller 506 to switch the internal circuitry 510 to closed loop operation (or, alternatively, the timing controller 506 switches the internal circuitry 510 to closed loop operation upon expiration of a defined period of time).

When the internal circuitry 510 operates in closed loop mode, the oscillator 512, error amplifier 514, comparator 516, and logic and driver circuitry 518 receive the regulated voltage Vreg supplied by the regulator 502 from the boosted output voltage Vout, and continue to drive the power transistor M1 to control the charging of the output capacitor Cout to the designed output voltage value (e.g., 3.3V) of the boost converter circuit 500. Specifically, the error amplifier 514 compares the bandgap voltage Vbg with a feedback voltage Vfb to generate an error signal, which is received at a PFM/PWM controller 524 and the comparator 516. The PFM/PWM controller 524 receives the signal from the error amplifier 514 and dictates whether the boost converter 500 operates in a pure PWM mode or a PFM/PWM switching mode. A compensator 526 produces a signal sensed from an inductor 528, wherein the compensator signal is combined with the output of a ramp wave generator 530 driven by the oscillator 512. The compensator signal is then compared to the error signal at the comparator 516. The output of the comparator 516 is then coupled (via switch 509) to the logic and driver circuitry 518, which drives the power transistor M1 with a pulse-width modulated voltage signal having a consistent peak voltage. If the boosted output voltage Vout is less than the desired output voltage (e.g., 3.3V), then the power transistor M1 continues to control the charging of the output capacitor Cout, until the boosted output voltage Vout is equal to the desired output voltage.

What is claimed is:

1. A circuit comprising:
    voltage regulating circuitry operable to produce a regulated voltage, wherein said voltage regulating circuitry comprises a first voltage regulator configured to generate said regulated voltage from an input power supply voltage during a first mode and a second voltage regulator configured to generate said regulated voltage from an output power supply voltage during a second mode;
    boost circuitry supplied from said input power supply voltage and said regulated voltage and operable to control switching of a transistor during said first mode and said second mode to generate said output power supply voltage from the input power supply voltage; and
    control circuitry operable to switch said voltage regulating circuitry from using the first voltage regulator to generate said regulated voltage in said first mode to using the second voltage regulator to generate said regulated voltage in said second mode in response to one of detecting said output power supply voltage reaching a threshold voltage or detecting expiration of a defined start-up time.

2. The circuit as set forth in claim 1, wherein said voltage regulating circuitry is a low drop-out voltage regulator operable in a self-switching configuration to switch from generating said regulated voltage from said input power supply voltage using the first voltage regulator to generating said regulated voltage from said output power supply voltage using the second voltage regulator.

3. The circuit as set forth in claim 1, wherein said voltage regulating circuitry and said boost circuitry receive a reference voltage from bandgap circuitry.

4. The circuit as set forth in claim 1, wherein said boost circuitry is operable in an open loop mode to drive switching of said transistor when said circuit is in said first mode and is operable in a closed loop mode to drive switching of said transistor when said circuit is in said second mode.

5. The circuit as set forth in claim 4, wherein said switching of said transistor is driven by a low duty cycle signal during said open loop mode.

6. The circuit as set forth in claim 4, wherein said switching of said transistor is driven by a pulse-width modulated signal during said closed loop mode.

7. A boost circuit comprising:
    a voltage regulator operable to provide a regulated voltage, wherein said voltage regulating circuitry comprises a first voltage regulator configured to generate said regulated voltage from an input power supply voltage during a start-up mode and a second voltage regulator configured to generate said regulated voltage from an output power supply voltage during a normal operation mode;
    boosting circuitry operable to receive said input power supply voltage at a first input and receive said regulated voltage at a second input and operable to control switching of a transistor, said transistor driving said output power supply voltage to a first voltage during said start-up mode; and
    a controller circuit operable to switch said boost circuit from said start-up mode to said normal operation mode in response to detecting said output power supply voltage reaching said first voltage.

8. The boost circuit as set forth in claim 7, wherein said boosting circuitry is further operable to control switching of said transistor to drive said output power supply voltage to a second voltage greater than said first voltage during said normal operation mode.

9. The boost circuit as set forth in claim 7, wherein said start-up mode is a low-power start-up mode.

10. The boost circuit as set forth in claim 7, wherein said voltage regulator is a low drop-out voltage regulator operable in a self-switching configuration to switch from generating said regulated voltage from said input power supply voltage using the first voltage regulator to generating said regulated voltage from said output power supply voltage using the second voltage regulator.

11. The boost circuit as set forth in claim 7, wherein said boosting circuitry is operable in an open loop mode to drive switching of said transistor when said boost circuit is in said start-up mode and is operable in a closed loop mode to drive switching of said transistor when said boost circuit is in said normal operation mode.

12. The boost circuit as set forth in claim 11, wherein said switching of said transistor is driven by a low duty cycle signal during said open loop mode.

13. The boost circuit as set forth in claim 11, wherein said switching of said transistor is driven by a pulse-width modulated signal during said closed loop mode.

14. The boost circuit as set forth in claim 7, wherein said control circuit switches said boost circuit from said start-up mode to said normal operation mode in response to detecting expiration of a defined start-up time.

15. A method for controlling operation of a boost converter circuit, the method comprising:
supplying a first voltage regulator with an input power supply voltage;
supplying a second voltage regulator with an output power supply voltage;
in a first mode of operation, producing a first regulated voltage at a regulated node, wherein said first regulated voltage is generated by the first voltage regulator from said input power supply voltage;
using said first regulated voltage to control switching of a transistor to drive said output power supply voltage to a first threshold voltage;
in a second mode of operation, producing a second regulated voltage at said regulated node, wherein said second regulated voltage is generated by the second voltage regulator from said output power supply voltage;
using said second regulated voltage to control switching of said transistor to drive said output voltage to a second threshold voltage; and
switching from the first mode of operation to the second mode of operation in response to one of detecting said output power supply voltage reaching a threshold voltage or detecting expiration of a defined start-up time.

16. The method as set forth in claim 15, further comprising switching said boost converter circuit from said first mode of operation to said second mode of operation in response to detecting said output power supply voltage reaching said first threshold voltage.

17. The method as set forth in claim 15, further comprising switching said boost converter circuit from said first mode of operation to said second mode of operation in response to detecting expiration of a defined start-up time.

18. The method as set forth in claim 15, further comprising operating boosting circuitry in an open loop mode to drive switching of said transistor when said boost converter circuit is in said first mode of operation, and operating said boosting circuitry in a closed loop mode to drive switching of said transistor when said boost converter circuit is in said second mode of operation.

19. The method as set forth in claim 18, wherein said switching of said transistor is driven by a low duty cycle signal during said open loop mode.

20. The method as set forth in claim 18, wherein said switching of said transistor is driven by a pulse-width modulated signal during said closed loop mode.

21. A circuit, comprising:
a boost converter circuit configured to receive an input voltage and generate an output voltage at an output, said boost converter circuit including a switching transistor operating to control voltage boosting from the input voltage to the output voltage;
a control circuit having a power supply input configured to receive a regulated voltage and generate a pulse control signal for application to a control terminal of the switching transistor; and
a voltage regulator circuit including a first power supply input configured to receive the input voltage and a second power supply input configured to receive the output voltage, said voltage regulator circuit operating to generate the regulated voltage for application to the power supply input of the control circuit from the input voltage in a first mode of operation during a start-up of the boost-converter circuit and operating to generate the regulated voltage for application to the power supply input of the control circuit from the output voltage in a second mode of operation after completion of said start-up of the boost-converter circuit.

22. The circuit of claim 21, wherein the control circuit generates the pulse control signal with an open loop circuit in the first mode of operation and generates the pulse control signal with a closed loop circuit in the second mode of operation.

23. The circuit of claim 21, wherein the voltage regulator circuit comprises:
a first low drop out regulator having the first power supply input configured to receive the input voltage and an output for generating the regulated voltage from the input voltage; and
a second low drop out regulator having the second power supply input configured to receive the output voltage and an output for generating the regulated voltage from the output voltage.

24. The circuit of claim 23, wherein the voltage regulator circuit further receives a reference voltage which is a fraction of the input voltage and the first low drop out regulator generates the regulated voltage from the input voltage based on the reference voltage.

25. The circuit of claim 24, wherein the voltage regulator circuit disables operation of the first low drop out regulator when the reference voltage exceeds a threshold.

26. The circuit of claim 23, wherein the voltage regulator circuit further receives a bandgap voltage and the second low drop out regulator generates the regulated voltage from the output voltage based on the bandgap voltage.

* * * * *